United States Patent
Kim et al.

(10) Patent No.: US 8,621,497 B2
(45) Date of Patent: Dec. 31, 2013

(54) OPTICAL DISC DRIVE HAVING A TRAY WITH A MAIN CIRCUIT BOARD AND SPOKE SENSOR

(75) Inventors: Hag-Ryeol Kim, Yongin-si (KR);
Sung-hun Lee, Yongin-si (KR);
Min-shik Roh, Seoul (KR); Hyun-woo Lee, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/338,793

(22) Filed: Dec. 28, 2011

(65) Prior Publication Data
US 2012/0174129 A1 Jul. 5, 2012

(30) Foreign Application Priority Data
Dec. 31, 2010 (KR) .................. 10-2010-0140689

(51) Int. Cl.
*G11B 17/03* (2006.01)
(52) U.S. Cl.
USPC .................... 720/652; 720/603; 720/677
(58) Field of Classification Search
USPC .............. 720/600, 601, 648–653, 671, 672, 720/676–680, 603, 606, 696, 697
See application file for complete search history.

(56) References Cited

U.S. PATENT DOCUMENTS

| | | | |
|---|---|---|---|
| 6,225,568 B1 * | 5/2001 | Lin et al. ................... | 174/250 |
| 6,898,037 B2 | 5/2005 | Leigh et al. | |
| 2006/0005212 A1 * | 1/2006 | Ichinose et al. ............... | 720/600 |
| 2006/0123438 A1 * | 6/2006 | Toyama et al. ............... | 720/674 |
| 2006/0161940 A1 * | 7/2006 | Arai et al. ..................... | 720/685 |
| 2007/0094677 A1 * | 4/2007 | Peng ............................. | 720/650 |
| 2008/0165633 A1 | 7/2008 | Hsiao et al. | |
| 2009/0278908 A1 | 11/2009 | Hu et al. | |
| 2010/0242057 A1 * | 9/2010 | Ou et al. ....................... | 720/696 |
| 2011/0197212 A1 * | 8/2011 | Yoo et al. ..................... | 720/703 |
| 2012/0072928 A1 * | 3/2012 | Ou et al. ....................... | 720/613 |

FOREIGN PATENT DOCUMENTS

| | | |
|---|---|---|
| JP | 2007-265471 | 10/2007 |
| JP | 2008-269688 | 11/2008 |
| JP | 2009-199661 | 9/2009 |
| KR | 10-20070018207 A | 2/2007 |
| KR | 10-0844534 B1 * | 7/2008 |

OTHER PUBLICATIONS

English translation of KR 10-0844534 B1.*
Korean Office Action issued Nov. 19, 2012 in counterpart Korean Application No. 10-2010-0140689 (4 pages, in Korean).

* cited by examiner

*Primary Examiner* — Nathan Danielsen
(74) *Attorney, Agent, or Firm* — NSIP Law (57) ABSTRACT

An optical disc drive including a housing, a tray that is installed in the housing and that is configured to receive an optical disc, which has a spoke region on a surface thereof, an optical pickup unit which is attached to the tray, a main circuit board which is installed on the tray and is operatively connected to the optical pickup unit, and a spoke sensor which is arranged on the main circuit board and corresponds to the spoke region of the optical disk.

19 Claims, 8 Drawing Sheets

OPTICAL DISC DRIVE HAVING A TRAY WITH A MAIN CIRCUIT BOARD AND SPOKE SENSOR

CROSS-REFERENCE TO RELATED PATENT APPLICATION

This application claims the benefit of Korean Patent Application No. 10-2010-0140689, filed on Dec. 31, 2010, in the Korean Intellectual Property Office, the entire disclosure of which is incorporated herein in by reference for all purposes.

BACKGROUND

1. Field

The present description relates to an optical disc drive, and additionally, to an optical disc drive supporting lightscribe function.

2. Description of the Related Art

Generally, a slim optical disc drive used in a laptop computer has a structure in which an optical pickup unit is installed on a tray that is configured to accommodate a disc, and a main circuit board that is configured to control the optical pickup device is installed in a housing (or a main body) that is configured to accommodate the tray. Because such a slim optical disc drive must comply with predetermined standards for maintaining the compatibility with general laptop computers, design variability is limited. In a conventional structure, an optical pickup unit having an individual completed structure is installed on a tray. The optical pickup unit includes a metal base on which a guiding shaft is installed and a main body that is installed on the guiding shaft and that back and forth with respect to the metal base. The optical pickup unit is a structurally complex unit and a base is generally formed of a metal plate. An optical disc drive may include a spoke sensor. A spoke sensor is generally configured for servo-controlling a spindle motor for writing a label on a surface of a lightscribe disc. The spoke sensor is arranged nearby the spindle motor. The spoke sensor generates information regarding a rotation of a spindle motor required for a servo signal by optically detecting spokes formed on a surface of a disc. In a conventional optical disc drive, a spoke sensor is mounted on an individual sensor substrate, and the sensor substrate is fixed close to a spindle motor.

SUMMARY

In one general aspect, there is provided an optical disc drive. The optical disc drive includes a housing, a tray operatively installed in the housing, the tray being configured to receive an optical disc, an optical pickup unit which is attached to the tray, a main circuit board which is installed on the tray and is operatively connected to the optical pickup unit, and a spoke sensor which is arranged on the main circuit board, wherein the optical disc comprises a spoke region on a surface thereof, and the spoke sensor is arranged so as to correspond to the spoke region of the optical disc.

The main circuit board may be arranged on a rear surface of the tray, and the main circuit board comprises an extended portion that penetrates the tray and the spoke sensor may be installed on the extended portion of the main circuit board.

The optical disc drive may include guiding shafts on which the optical pickup unit is installed, and along which the optical pickup moves. The guiding posts may be installed on the tray. The optical disc drive may also include supporting posts which support the guiding shafts. The supporting posts may be integrally formed with and protrude from the tray.

The optical disc drive may include at least one penetration hole, which is formed at an end of the housing so as to reduce capacitance coupling between a fixed portion of a ribbon cable and the housing.

The optical disc drive may include at least one penetration hole, which is formed at an end of the housing so as to reduce capacitance coupling between a fixed portion of a ribbon cable and the housing.

The optical disc drive may include a connector that is electrically connected to the main circuit board installed on the tray. The connector may be configured to connect with an external device, and the connector being arranged on the housing.

The optical disc drive may include a spindle motor that is configured to drive the optical disc, wherein a rotation shaft of the spindle motor is directly fixed to the tray.

The optical disc drive may include a spindle motor that is configured to drive the optical disc, wherein a rotation shaft of the spindle motor is directly fixed to the tray.

A connector may be arranged at an end of the housing, and a cable which is folded so that portions thereof cross each other and is interposed between the main circuit board and the connector. The cable may be a ribbon cable.

The optical disc drive may be installed in an electronic device. The electronic device is one of a portable game console, a portable/personal multimedia player (PMP), a portable lap-top PC, a desktop PC, a high definition television (HDTV), an optical disc player, and an optical disc recorder.

In another aspect, there is provided an optical disc drive. The optical disc drive includes a housing which includes a base and a cover; a tray operatively installed in the housing and integrally formed with guiding posts that are configured to guide movement of an optical pickup unit, a spindle motor that is configured to drive an optical disc having a spoke region on a surface thereof, a main circuit board which is installed on a rear surface of the tray and is operatively connected to the optical pickup unit, and a spoke sensor which is arranged on the main circuit board, wherein the spoke sensor is arranged so as to correspond to the spoke region of the optical disc.

The optical disc drive may include a connector operatively installed at an end of the housing, and a cable that is interposed between the main circuit board and the connector. The cable may be folded so that portions thereof cross each other. The cable may be a ribbon cable.

The optical disc drive may be installed in an electronic device. The electronic device is one of a portable game console, a portable/personal multimedia player (PMP), a portable lap-top PC, a desktop PC, a high definition television (HDTV), an optical disc player, and an optical disc recorder.

The spindle motor may include a rotation shaft that is directly fixed to the tray.

In another aspect, there is provided an optical disc drive. The optical disc drive includes a housing which includes a base and a cover, a tray operatively installed in the housing and integrally formed with guiding posts that are configured to guide movement of an optical pickup unit, a spindle motor that is configured to drive an optical disc having a spoke region on a surface thereof, a main circuit board which is installed on the rear surface of the tray and is operatively connected to the optical pickup unit, a cable interposed between the base and the tray, and a spoke sensor which is arranged on the main circuit board, wherein the spoke sensor is arranged so as to correspond to the spoke region of the optical disc.

The spindle motor may include a rotation shaft that is directly fixed to the tray.

The cable may include a plurality of wire layers. The optical disc drive may include a plurality of penetration holes formed in a particular wire layer of the cable. The cable may be a ribbon cable.

The optical disc drive may be installed in an electronic device. The electronic device is one of a portable game console, a portable/personal multimedia player (PMP), a portable lap-top PC, a desktop PC, a high definition television (HDTV), an optical disc player, and an optical disc recorder.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
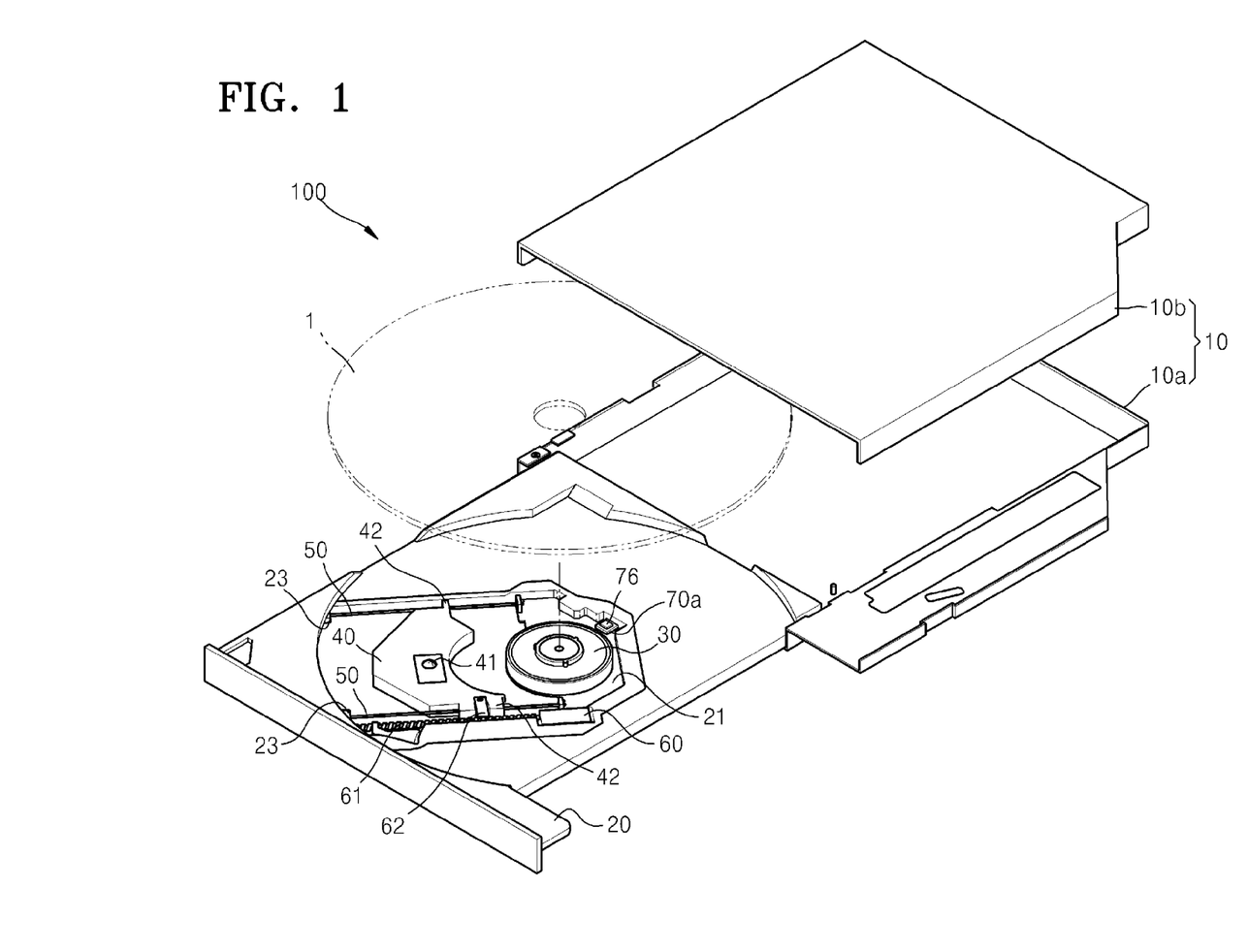
FIG. 1 is drawing illustrating an example of an optical disc drive.

FIG. 1 is an outer perspective view of an optical disc drive 100.

Referring to FIG. 1, a tray 20 is attached to a housing 10, which includes a base 10a and a cover 10b, such that the tray 20 may slide into and out of the housing 10. For example, the tray 20 may slide into and out of the housing 10 in similar fashion as a drawer. A spindle motor 30 onto which a disc 1 is mounted and an optical pickup unit 40 are installed on the tray 20. The optical disc drive 100 may also have an extension portion 70a of a main circuit board that is installed on the rear surface of the tray 20. As an example, the extension portion 70a is located at an end of the spindle motor 30, where a spoke sensor 76 is also arranged. The spoke sensor 76 generates a disc rotation signal for servo-controlling the spindle motor 30 in relation to a label printed on a surface of the disc 1. The optical pickup unit 40 is installed on two guiding shafts 50. The guiding shafts 50 may be fixed in parallel relative to the tray 20. The optical pickup unit 40 includes an object lens 41 and an actuator (not shown) which is configured to drive the object lens 41. The optical disc drive 100 may also include guiding units 42 which are configured to slide along the guiding shaft 50. The guiding units 42 may be arranged at two opposite ends of the optical pickup unit 40. Meanwhile, a transporting motor 60 including a screw 61 is arranged as a transporting unit that is configured to transport the optical pickup unit 40 back and forth. The screw 61 is operatively geared to a screw gearing unit 62 that is combined with the optical pickup unit 40. Accordingly, the optical pickup unit 40 moves back and forth along the guiding shafts 50 based on a rotation of the screw 61.

Figure 2:
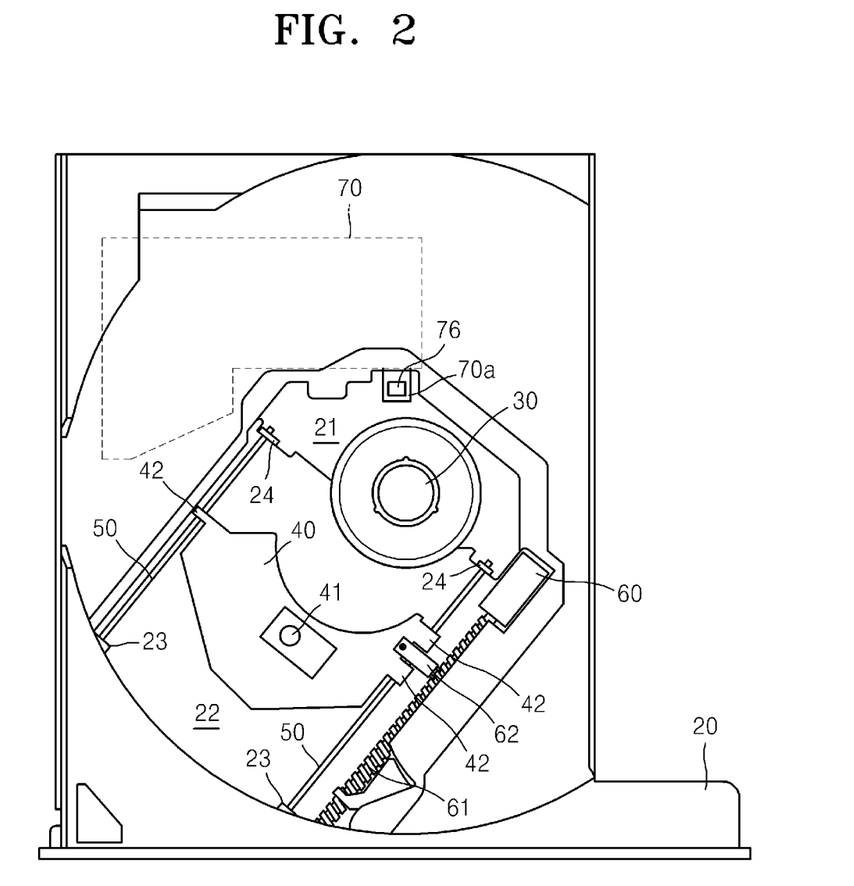
FIG. 2 is a drawing illustrating an example of an optical disc drive.

Referring to FIG. 2, a structure of an optical disc drive will be described in closer detail.

The tray 20 provides a space portion 22 in which the optical pickup unit 40 may be installed and move. For example, as the optical pickup unit 40 moves along the guiding shafts 50 based on rotation of the screw, the optical pickup unit 40 moves throughout the space portion 22. The guiding shafts 50 are arranged in parallel to each other at two opposite ends of the space portion 22. As an example, two opposite ends of each of the two guiding shafts 50 are supported by supporting posts 23 and 24 that are arranged on the tray 20. As an example, the supporting posts 23 and 24 may be integrated in the tray 20. The optical pickup unit 40 is supported by the guiding shafts 50. As an example, two opposite ends of the optical pickup unit 40 may be supported by the guiding shafts 50 via the guiding units 42. The guiding units 42 may be provided in close proximity or adjacent to the where the screw gearing unit 62 that is operatively geared with the screw 61 of the transporting motor 60 is arranged at an end of the optical pickup unit 40.

Figure 3A:
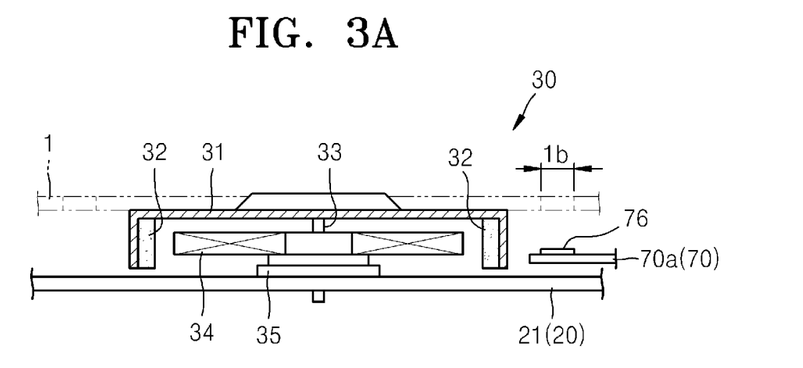
FIG. 3A is a drawing illustrating an example of a location of a spoke sensor and a schematic sectional view of a spindle motor directly arranged on a tray, in an optical disc drive.

Meanwhile, a motor base 21, which functions as a base of the spindle motor 30, is arranged at an end of the space portion 22 of the tray 20. As an example, the motor base 21 is a part of the tray 20. Accordingly, as illustrated in FIG. 3A, a shaft supporting unit 35 including a bearing (not shown) for supporting a rotation shaft 33 of the spindle motor 30 is fixed to the motor base 21. A magnetic coil unit 34 may be fixed to the upper portion of the shaft supporting unit 35. The magnetic coil unit 34 is a stator. A rotator 31 is operatively coupled to the rotation axis 33. The rotator 31 has an upper surface on which the storage medium (not shown) is installed. The rotator 31 may also have permanent magnets 32 installed therein. Further, as an example, the spindle motor 30 may be operatively installed on a portion of the tray 20 so as to have a complete structure of a motor. In other aspects, the spindle motor may be formed separately from the tray 20. As a non-limiting example, the rotation axis 33 may be an axle which rotates the storage medium about an axis of rotation. In other aspects, a motor base may be arranged separately and a part of the tray 20 is used as the motor base 21. The spindle motor 30 forms a complete structure as a motor by being attached to a portion of the tray 20. As an example, an extension portion 76 of a main circuit board extends toward the rotation center of the spindle motor 30. The extension portion 76 has installed thereon a spoke sensor 76. The spoke sensor 76 may be configured for servo-controlling a spindle motor for writing a label on a surface of a lightscribe disc FIG. 3A illustrates an example of a relationship between a spoke region 1b of the disc 1 mounted on the spindle motor 30 and the spoke sensor 76. As shown in FIG. 3A, the spoke sensor 76 is arranged just below the spoke region 1b of the disc 1.

Figure 3B:
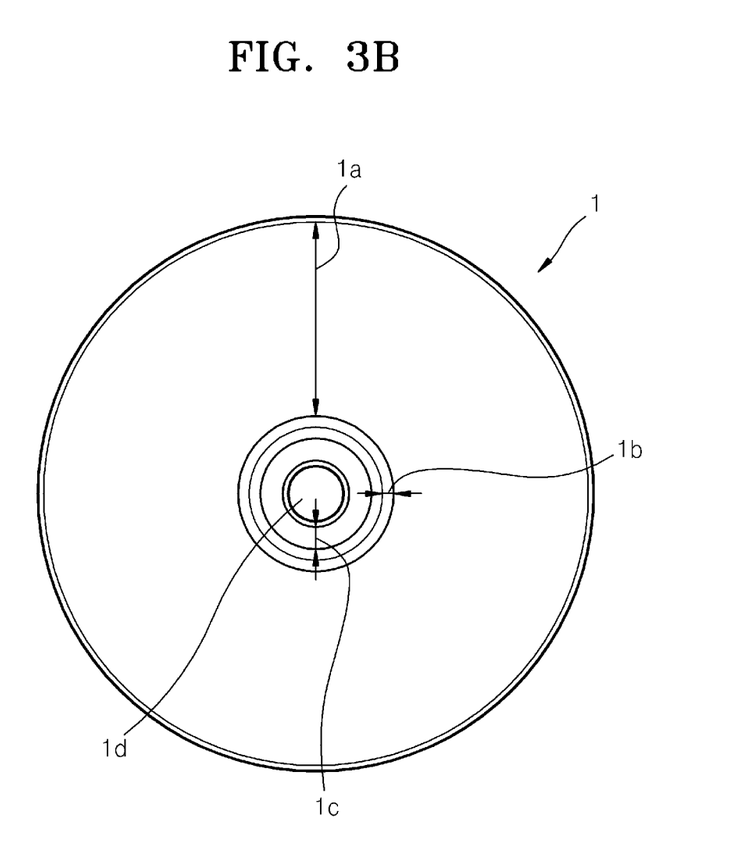
FIG. 3B is a drawing illustrating an example of a spoke region on a surface (label surface) of a general lightscribe optical disc.

Furthermore, as shown in FIG. 3B, a label zone 1a, on which a label is printed via lightscribe, is arranged on a surface of the disc 1. The label zone 1a is on a surface opposite to a recording surface. For example, the label zone 1a may be on a top surface of the disc 1 and the recording surface may be on a bottom surface of the disc 1. The disc may be configured such that a clamping and a logo zone 1c is arranged around a penetration hole 1d, and a control feature zone including the spoke region 1b is arranged between the logo zone 1c and the label zone 1a. In other words, the label zone 1a is arranged so as to be around the spoke region 1b.

Figure 4:
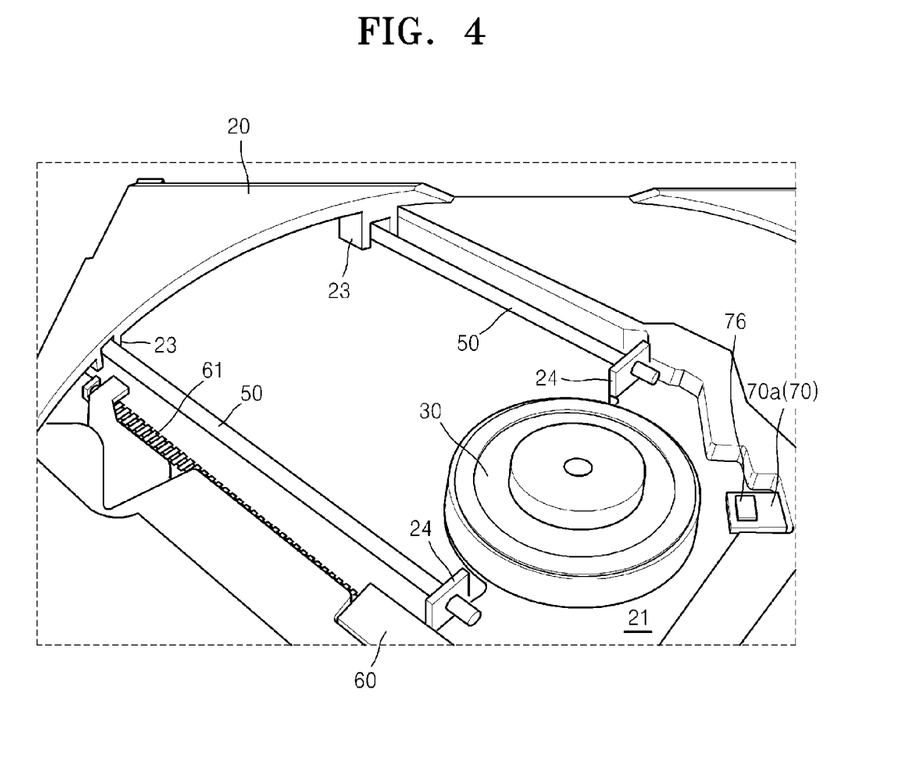
FIG. 4 is a drawing illustrating an example of guiding shafts and supporting posts supporting the guiding shafts in an optical disc drive.
Figure 5A:
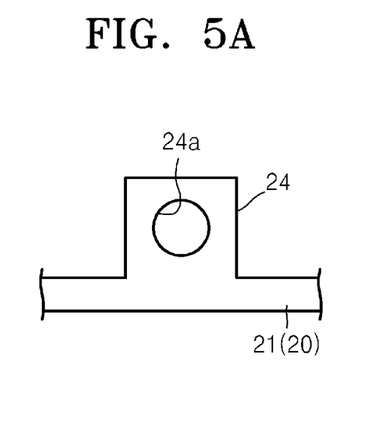
FIGS. 5A and 5B are drawings illustrating an example of supporting posts which support guiding shafts, in an optical disc drive.
Figure 5B:
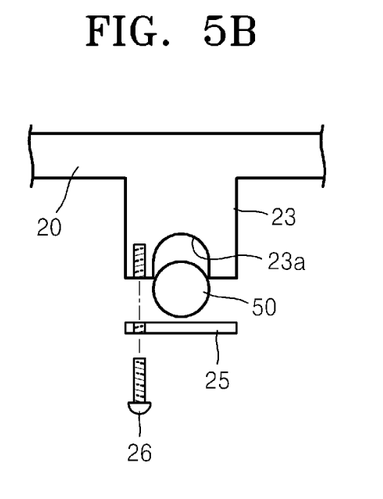

FIG. 4 illustrates an example of the supporting posts 23 and 24 which support the guiding shafts 50. As illustrated in FIG. 4, the supporting posts 23 and 24 may be fixed in an optical disc drive. FIGS. 5A and 5B are drawings illustrating an example of supporting posts 23 and 24.

The supporting posts 23 and 24 by which the two opposite ends of the guiding shafts 50 are supported may be arranged on the rear surface of the tray 20 and at an end of the motor base 21, respectively. As illustrated in FIGS. 4 and 5a, a first supporting post 24 includes penetration holes 24a into which first ends of the guiding shafts 50 are inserted. As illustrated in FIG. 5b, a second supporting post 23 includes mount-type insertion holes 23a into which second ends of the guiding shafts 50 are inserted from below. A separate fixing member 25 and a screw 26 for fixing the fixing member 25 may be arranged at the insertion holes 23a to prevent the guiding shafts 50 from detaching. In other words, the fixing member 25 may be operatively coupled to the second supporting post 23 so as to provide support for the guiding shaft 50.

Figure 6:
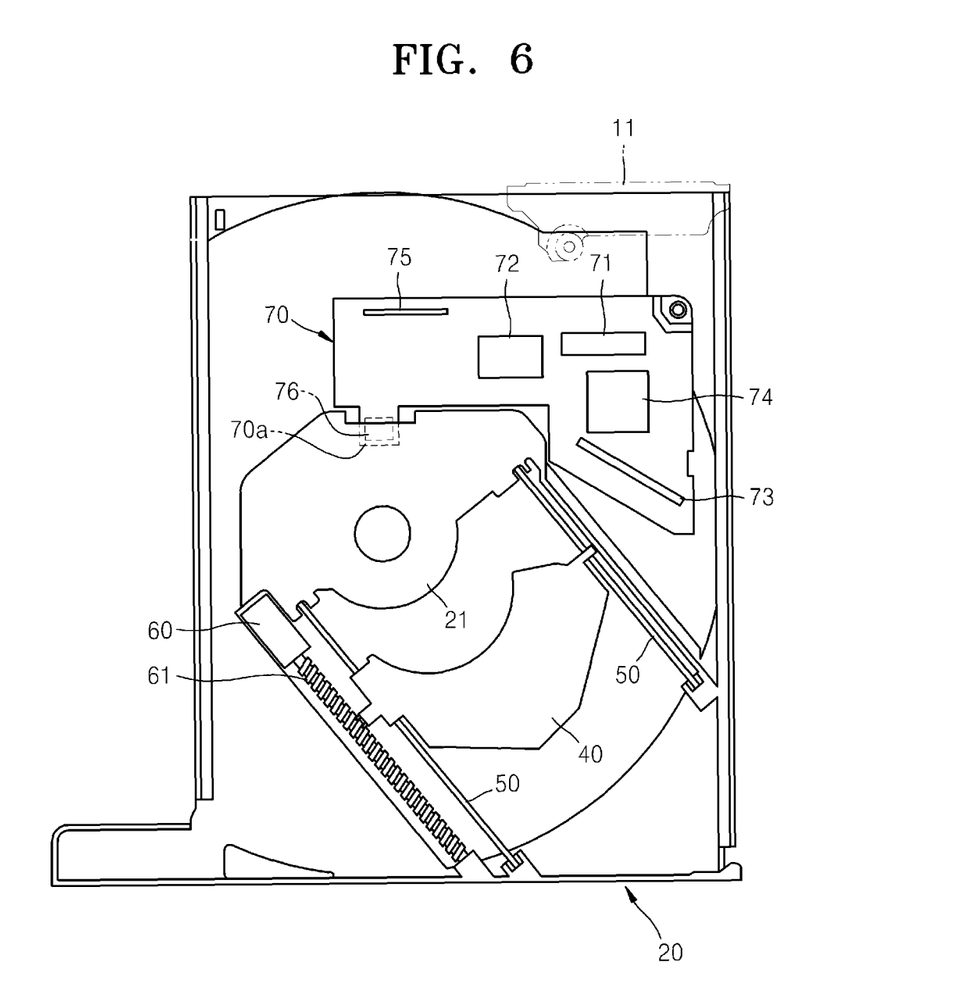
FIG. 6 is a drawing illustrating an example of an arrangement of a main circuit board attached to the rear surface of a tray, in an optical disc drive.

FIG. 6 shows the rear surface of the tray 20 in an optical disc drive from which an optical pickup unit and guiding shafts are omitted.

A main circuit board 70 of an optical disc drive is arranged on the rear surface of the tray 20. The main circuit board may be a printed circuit board (PCB). The extension portion 70a is formed at an end of the main circuit board 70. As illustrated in FIGS. 1 and 2, the extension portion 70a penetrates through the tray 20 and is exposed on the top surface of the tray 20. The main circuit board 70 is so-called a front-end part. The main circuit board 70 may include a high frequency amplifier (RF amplifier), a servo circuit, and an interface. For example, the main circuit board 70 may include an output interface connector 71, a connector 73 that is connected to the optical pickup, chipsets 72 and 74 of a microcomputer, and a connector 75 that is connected to the spindle motor.

Figure 7:
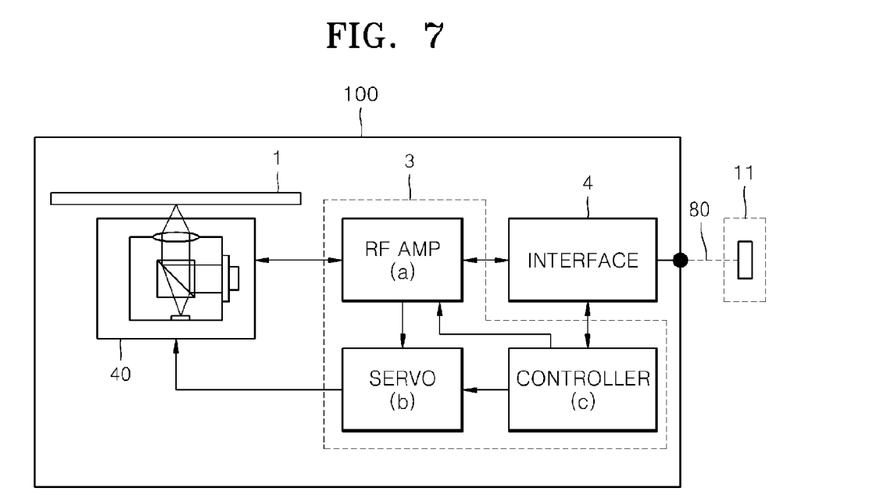
FIG. 7 is a drawing illustrating an example of the main circuit board employed in an optical disc drive.

For example, a front-end system 3 includes an RF amplifier "a" that amplifies signals from the optical pickup unit 40, a servo unit "b" which controls tracking and focusing mechanisms of the optical pickup unit 40, and a system control unit "c" that controls the RF amplifier "a" and the servo unit "b." As an example, in the front-end system, a current/voltage amplifier may be arranged in front of an RF amplifier. The RF amplifier may output, for example, raw data (e.g., a signal), which is final amplification of a high frequency signal. The RF amplifier may output the signal to a master unit, (e.g., a laptop computer), via an interface 4. The main circuit board 70 also includes a circuit for controlling a spindle motor by using a signal from the spoke sensor 76. The circuit may be included in the servo unit "b."

As described above, if the main circuit board 70 is arranged on the bottom surface of the tray 20, it is not necessary for a housing to include a conventional interface unit. In other words, the housing may simply include only a simple interface connector, such as, for example, a SATA connector.

Figure 8:
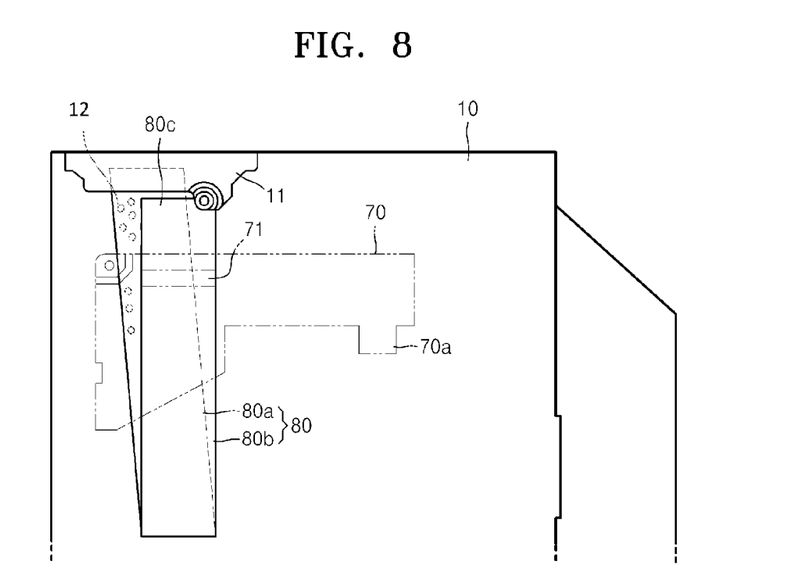
FIG. 8 drawing illustrating an example of an arrangement of a ribbon cable for outputting signals, which is formed at a housing base, in an optical disc drive.

FIG. 8 illustrates an example of an output interface connector 11 operatively installed on a housing 10. For example, the output interface connector 11 may be arranged at a rear end of the housing 10. The output interface connector 11 is connected to the connector 71 arranged on the tray 20 via a ribbon cable 80, such as, for example, a flexible film cable (FFC). The ribbon cable 80 may include a fixed portion 80a which faces the housing 10 in response to movements of the tray 20 as it slides into and out of the housing 10 like a drawer. The ribbon cable 80 may also include a movable portion 80b that may be positioned so as to overlap the fixed portion 80a. The movable portion 80b may move while the movable portion 80b is overlapped by the fixed portion 80a. The leading end portion of the movable portion 80b is operatively coupled with the connector 71 arranged at the tray 20. The fixed portion 80a and the movable portion 80b are arranged so as to cross each other in a "V" shape instead of being parallel to each other. In other words, the fixed portion 80a and the movable portion 80b are arranged so as not to be parallel with each other. The fixed portion 80a and the movable portion 80b are positioned in such a manner because same signal lines of the fixed portion 80a and the movable portion 80b of the ribbon cable 80 do not overlap each other. Therefore, signal interference due to overlapping of same signal lines may be substantially eliminated. As described above, the fixed portion 80a and the movable portion 80b are arranged to cross each other to reduce or eliminate signal interference and the movable portion 80b is arranged in parallel to a direction in which the tray 20 moves, and thus, abnormal distortion of the movable portion 80b is prevented.

Figure 9:
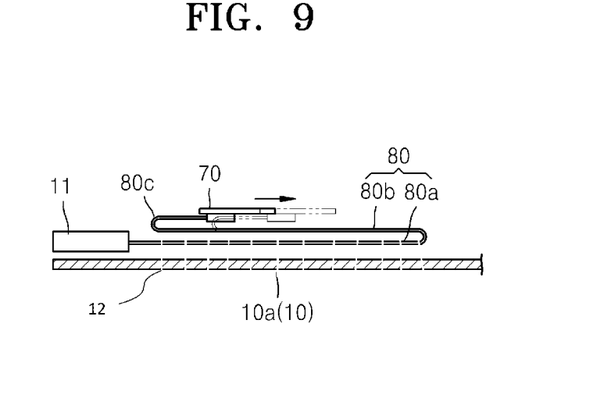
FIG. 9 is a drawing illustrating an example of a ribbon cable such as, for example, the ribbon cable illustrating in FIG. 8.

FIG. 9 is a schematic lateral view of the ribbon cable 80 which is folded.

As an example, the ribbon cable 80 may be folded twice. The fixed portion 80a located at the lowermost portion may be fixed to the bottom base 10a of the housing 10, and the movable portion 80b above the fixed portion 80b has a 'U'-shape that includes a bending portion 80c. In response to the main circuit board 70 moving according to movement of the tray 20, locations of the bent portions 80 of the movable portion 80b are changed.

Figure 10:
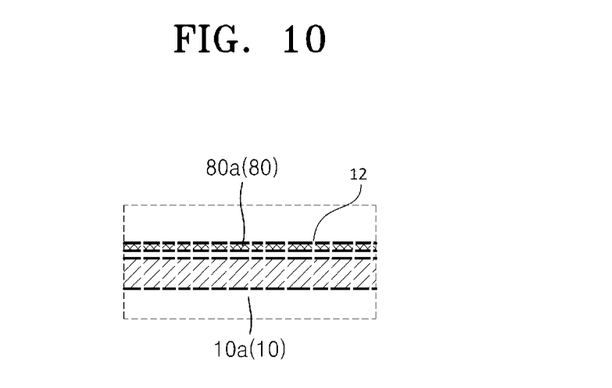
FIG. 10 is a drawing illustrating an example of a penetration hole formed at the bottom of a housing to suppress capacitance coupling between the bottom of the housing and a ribbon cable.

As an example, as shown in FIGS. 8, 9, and 10, a plurality of penetration holes 12 which penetrate the bottom 10a of the housing 10 may be formed at the bottom of the fixed portion 80a of the ribbon cable 80. The penetration holes 12 suppress capacitance coupling between the bottom 10a of the housing 10 and the ribbon cable 80, and thus distortion or interference of signals due to capacitance coupling between the bottom 10a of the housing 10 and the ribbon cable 80.

As an example, an optical pickup unit may be directly installed to a tray, and thus, cost reduction due to reductions in a number of parts and a number of manufacturing operations may be obtained. Furthermore, because an optical pickup unit is directly installed on a tray without a separate base, an additional internal space corresponding to volume of the separate base may be utilized.

Furthermore, because a spindle motor, which is manufactured as a separate component in the related art, is installed on a tray, a number of parts required for the manufacture and assembly of an optical drive may be reduced. Furthermore, because a main circuit board is directly installed on a tray, a distance between an optical pickup unit and the main circuit board may be reduced, and thus signal loss between the optical pickup unit and the main circuit board may be reduced. Furthermore, because a spoke sensor is mounted on a main circuit board, no separate spoke sensor unit module as in the related art is necessary, and thus, a cost-wise benefit may be expected therefrom.

Disk drives as described in the above examples may be included in an electronic device. As a non-exhaustive illustration only, an electronic device described herein may refer to mobile devices such as a digital camera, a portable game console, a portable/personal multimedia player (PMP), a portable lap-top PC, and devices such as a desktop PC, a high definition television (HDTV), an optical disc player, a set top box, and the like capable of wireless communication or network communication.

The units described herein may be implemented using hardware components and software components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the examples disclosed herein can be easily construed by programmers skilled in the art to which the examples pertain based on and using the flow diagrams and block diagrams of the figures and their corresponding descriptions as provided herein.

In one aspect, there is provided an optical disc drive with a smaller number of parts, thus enabling simplification of a process for manufacturing the same and reduction in costs for manufacturing the same.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical disc drive comprising:
a housing;
a tray operatively installed in the housing, the tray being configured to receive an optical disc;
an optical pickup unit which is attached to the tray;
a main circuit board which is installed on a rear surface of the tray, the main circuit board comprising an extended portion that penetrates the tray, and the main circuit board is operatively connected to the optical pickup unit; and
a spoke sensor which is arranged on the main circuit board and ins installed on the extended portion of the main circuit board, wherein
the optical disc comprises a spoke region on a surface thereof; and
the spoke sensor is arranged so as to correspond to the spoke region of the optical disc.

2. The optical disc drive of claim 1, wherein guiding shafts on which the optical pickup unit is installed, and along which the optical pickup moves, are installed on the tray, and supporting posts which support the guiding shafts are integrally formed with and protrude from the tray.

3. The optical disc drive of claim 2, further comprising at least one penetration hole, which is formed at an end of the housing so as to reduce capacitance coupling between a fixed portion of a ribbon cable and the housing.

4. The optical disc drive of claim 2, wherein a connector is arranged at an end of the housing, and a cable which is folded so that portions thereof cross each other and is interposed between the main circuit board and the connector.

5. The optical disc drive of claim 1, further comprising at least one penetration hole, which is formed at an end of the housing so as to reduce capacitance coupling between a fixed portion of a ribbon cable and the housing.

6. The optical disc drive of claim 1, wherein a connector is electrically connected to the main circuit board installed on the tray, the connector being configured to connect with an external device, and the connector being arranged on the housing.

7. The optical disc drive of claim 6, further comprising a spindle motor that is configured to drive the optical disc, wherein the spindle motor is mounted on the tray and a rotating shaft supporting portion is directly fixed to the tray.

8. The optical disc drive of claim 1, further comprising a spindle motor that is configured to drive the optical disc, wherein the spindle motor is mounted on the tray and a rotating shaft supporting portion is directly fixed to the tray.

9. The optical disc drive of claim 1, wherein the main circuit board comprises a high frequency amplifier, a servo circuit, and a connector for connecting to an output interface connector on the housing via a cable.

10. The optical disc drive of claim 1, wherein the optical disk drive is installed in an electronic device, wherein the electronic device is one of a portable game console, a portable/personal multimedia player (PMP), a portable lap-top PC, a desktop PC, a high definition television (HDTV), an optical disc player, and an optical disc recorder.

11. An optical disc drive comprising:
a housing;
a tray operatively installed in the housing;
a spindle motor that is configured to drive an optical disc;
a main circuit board having a portion which penetrates; and
a spoke sensor which is arranged on the penetrating portion of the main circuit board.

12. The optical disc drive of claim 11, further comprising:
a connector operatively installed at an end of the housing; and
a cable that is interposed between the main circuit board and the connector,
wherein the cable is folded so that portions thereof cross each other.

13. The optical disc drive of claim 11, wherein the spindle motor is mounted on the tray and a rotating shaft support portion is directly fixed to the tray.

14. The optical disc drive of claim 11, wherein the main circuit board comprises a high frequency amplifier, a servo circuit, and a connector for connecting to an output interface connector on the housing via a cable.

15. The optical disc drive of claim 11, wherein the optical disk drive is installed in an electronic device, wherein the electronic device is one of a portable game console, a portable/personal multimedia player (PMP), a portable lap-top PC, a desktop PC, a high definition television (HDTV), an optical disc player, and an optical disc recorder.

16. An optical disc drive comprising:
a housing;
a tray;
a circuit board which is installed on the tray and has a portion extending through the tray; and
a spoke sensor which is arranged on the extended portion of the circuit board.

17. The optical disc drive of claim 16, further comprising a spindle motor and a rotating shaft support portion, wherein the spindle motor is mounted on the tray and the rotating shaft support portion is directly fixed to the tray.

18. The optical disc drive of claim 16, further comprising a cable, wherein the cable comprises a plurality of wire layers, and a plurality of penetration holes are formed in a particular wire layer of the cable.

19. The optical disc drive of claim 16, wherein the circuit board comprises a high frequency amplifier, a servo circuit, and a connector for connecting to an output interface connector on the housing via a cable.

* * * * *